Patented Dec. 4, 1934

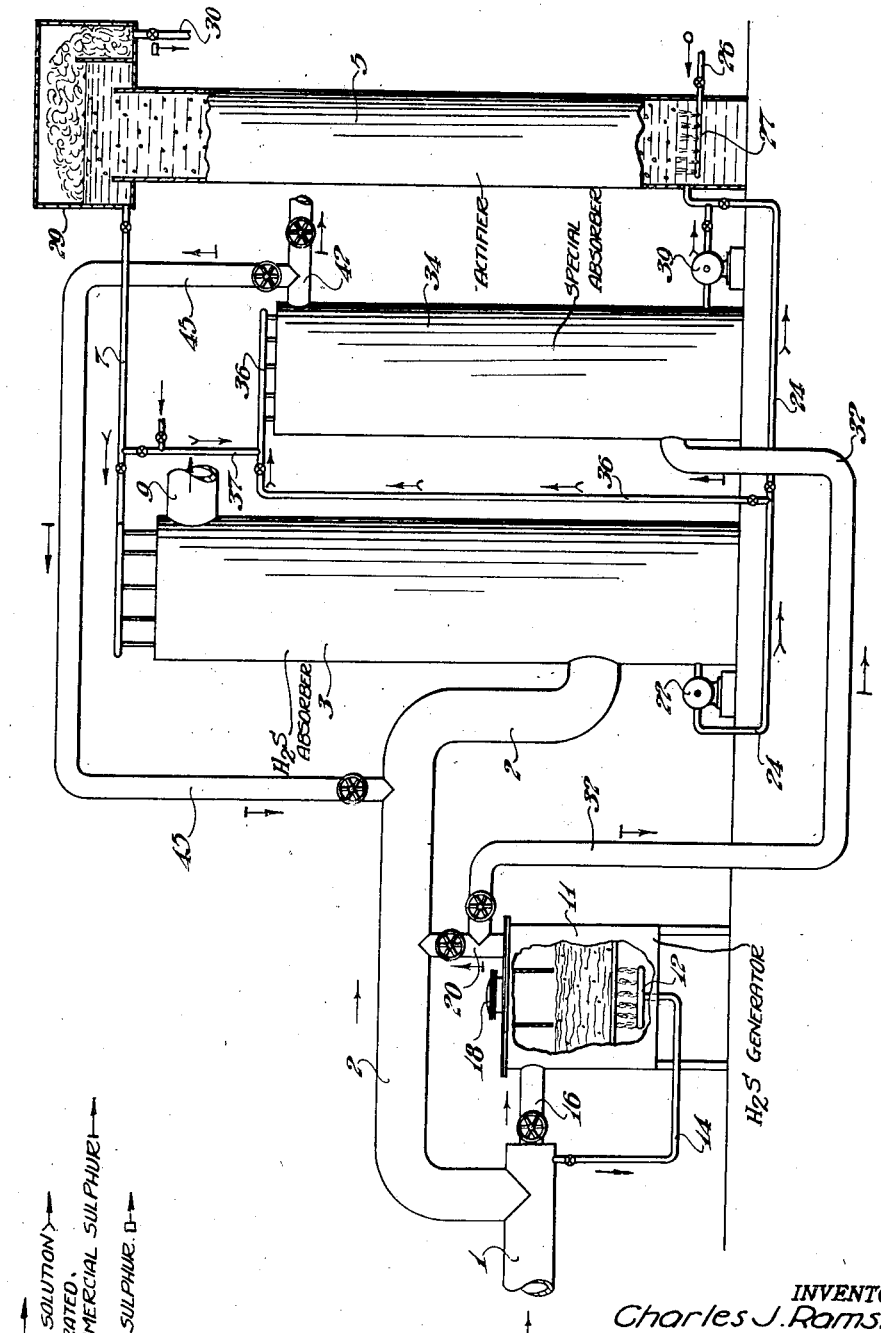

1,983,399

UNITED STATES PATENT OFFICE 1,983,399

SULPHUR PREPARATION

Charles J. Ramsburg, Edgeworth, Pa., assignor to The Koppers Company of Delaware, a corporation of Delaware Application August 5, 1931, Serial No. 555,227

3 Claims. (Cl. 23—224)

My invention relates to the preparation of finely divided sulphur, and especially to the preparation of such sulphur from ordinary commercial sulphur or brimstone.

Sulphur is widely used in agriculture for a variety of purposes and especially as a fungicide and/or insecticide, with or without being previously combined or mixed with other compounds. It is also used as a constituent of medicinal soaps and for many other purposes. For such purposes, finely divided or "colloidal" sulphur is highly desirable, and in many instances it has been found that the reactivity and efficiency of sulphur is proportional to its fineness, other conditions being equal.

For this reason, commercial sulphur or brimstone, which is ordinarily recovered in the form of lumps of large size, is usually ground to yield a commercial ground sulphur before employing it for agricultural purposes and the like. This ground sulphur or flowers of sulphur consists principally of particles which are 25 to 200 microns in size.

In the purification of fuel gases such as coke oven gas, natural gas, water gas and the like from hydrogen sulphide by sulphur recovery liquid purification processes such as the Thylox process, the Ferrox process, and the Nickel process, for example, sulphur is recovered in elemental form as a by-product. This sulphur is sometimes known as flotation sulphur, gas-house sulphur, by-product sulphur, etc., and is characterized by very small particle size. In substantially all of its particles, the largest dimension is less than 15 microns.

Many of the particles are much smaller than this and have maximum dimensions no greater than 1 or 2 microns. This flotation sulphur therefore approaches a colloidal degree of sub-division or dispersion, and exhibits many colloidal properties, such as Brownian movement, permanence of suspension, and the like. Largely for this reason, and also possibly because of salts adsorbed in the sulphur during its recovery, the flotation sulphurs are highly effective as or in fungicides, insecticides, medicinal soaps and similar preparations.

The effectiveness of these sulphurs is much greater than that of any sulphur which can economically be prepared by grinding brimstone and the like, due to the mechanical difficulties and high costs incurred in attempting to reduce the ordinary sulphur to a similar degree of sub-division.

An object of my present invention is to provide an improved process of preparing sulphur of substantially colloidal fineness.

Another object of my invention is to provide a process whereby ordinary coarse sulphur or brimstone is converted into a sulphur having the fineness and other desirable properties of flotation sulphurs, and suitable apparatus therefor.

My invention has for further objects such other advantages and results as are found to obtain in the process and apparatus described and claimed herewith.

Broadly stated, my invention contemplates converting commercial sulphur into substantially entirely gaseous hydrogen sulphide, which is absorbed in a solution similar to those employed in the sulphur recovery liquid purification processes, and recovered therefrom in the form of elemental sulphur of approximately colloidal fineness and having the desirable characteristics of flotation sulphur. I have found that this conversion may be accomplished economically in a manner which will be set forth in detail hereinbelow.

The crude sulphur can be converted to $H_2S$ by heating with a hydrocarbon which may be gaseous, liquid or solid, or with any organic compound or mixture containing carbon and hydrogen, or with hydrogen or gases containing hydrogen. Examples of suitable materials with which to heat crude sulphur to effect its conversion to $H_2S$, are fuel gases, such as coke oven gas, coal gas, or water gas; hydrocarbon oils; and coal, coke or the like to which sulphur may be added during a process of gasification, as in a coke-oven, water-gas generator, or gas producer.

As a further alternative, I may heat the sulphur with iron, which is preferably in finely divided form, to form iron sulphide which is then treated with acid to form $H_2S$. I may also heat the coarse sulphur with aluminum, magnesium, or the like, to form sulphides which are decomposed by water or acids to yield very pure $H_2S$.

The $H_2S$ obtained from the crude sulphur by any desired method, but preferably by heating with hydrogen or a hydrocarbon, is then added to impure fuel gas entering an $H_2S$ absorber forming a part of a sulphur recovery gas purifying system of any desired type, or it is absorbed separately in a suitable solution or suspension. The solution containing absorbed $H_2S$ is then actified, that is, regenerated so as to condition it to absorb further quantities of $H_2S$, as by aeration, to liberate flotation sulphur of substantially colloidal fineness. This sulphur separates from the solution as a froth and is recovered from the froth.

as by filtration, in the form of sulphur paste. The actified solution, that is, the solution regenerated as aforesaid, is then recirculated to absorb more H₂S.

One modification of this procedure consists in passing H₂S generated from ordinary sulphur through a separate tower countercurrent to the fouled solution leaving an H₂S absorber employed for the purification of fuel gases in the usual manner. The ordinary fouled solution is thereby further enriched or fouled with H₂S, and this highly fouled solution then goes to the actifier or thionizer where it is oxidized and colloidal sulphur is liberted and recovered as before.

I will now describe with reference to the accompanying drawing a preferred method of practicing my improved process of treating sulphur to convert it into substantially colloidal or very finely divided form.

In the drawing the single figure is a somewhat diagrammatic elevational view, with parts broken away, of apparatus suitable for the practice of my invention.

Fuel gas such as coke oven gas or the like flows through pipes 1 and 2 into a hydrogen sulphide absorber 3. This absorber may be of any type suitable to bring about intimate contact between gases and liquids, such as a tower packed with diamond hurdles, coke, spiral title, or the like. Actified solution or suspension is supplied to this absorber from an actifier 5, which is an apparatus adapted to regenerate, as aforesaid, the solution and which may be of the pressure thionizer type consisting of a relatively tall tower having relatively small cross-sectional area as shown in the drawing.

The solution passes from the actifier 5 through a pipe 7 to sprays or other suitable distributing devices (not shown) which distribute the solution over the contact material with which the absorber 3 is packed. Gas entering the absorber from the pipe 2 passes upwardly through the packing contained therein countercurrently to the flow of actified solution, which absorbs H₂S from the gas. The purified gas passes from the absorber through pipe 9 for storage or further purification or other disposal.

The solution or suspension may be any liquid of the type employed in sulphur recovery liquid purification processes known to the art, such as a liquid containing a compound capable of combining with H₂S to form a compound which liberates elemental sulphur in very finely divided form when subjected to the influence of an oxidizing agent. Examples of such liquids are alkaline solutions and suspensions containing a compound of arsenic, iron, nickel, or other elements of the iron group and the arsenic group.

Hydrogen sulphide is produced in a generator 11, which may be of any suitable form, such as an autoclave or other vessel adapted to being heated. Sulphur is melted in this vessel, as by heat supplied by a gas burner 12, which may be supplied with fuel gas withdrawn from pipe 1 through pipe 14. The sulphur in the vessel is preferably maintained at a temperature near its boiling point, although other temperatures may be maintained.

Material containing hydrogen, or a hydrocarbon, or both, is contacted with the molten sulphur, with which it reacts to form H₂S, and a catalyst may be employed to accelerate the reaction, if desired. For example, part of the gas flowing through pipe 1 may pass through pipe 16 into the vessel 11 where hydrogen and/or hydrocarbons contained in the gas react with the sulphur to form H₂S. Alternatively, oil or other solid, liquid, or gaseous hydrocarbon material may be charged with the sulphur into the generator 11, as through the port 18.

The H₂S generated in any case passes from the generator through a pipe 20. This H₂S may be allowed to pass directly through pipe 20 into pipe 2 where it is combined with the gas entering the absorber 3, and the generated H₂S is in that case absorbed along with the H₂S normally present in the gas.

The fouled solution containing the H₂S removed from the gas is withdrawn from the bottom of the absorber 3 and delivered by a pump 22 through a pipe 24 into the actifier 5. When the actifier is a pressure thionizer, as in the present instance, the fouled solution is delivered to a point near the bottom thereof and passes upwardly through the tower concurrently with air or other oxygen-containing gas supplied through a pipe 26 and a perforated pipe 27 or other suitable distributing device.

During its upward passage through the thionizer, the solution is actified and sulphur is liberated in the form of a froth, which separates from the solution in a separator 29 forming the upper part of the thionizer 5. The froth is then withdrawn through a pipe 30 to a sulphur slurry tank or filter or other suitable place of disposal, and the actified solution is returned through pipe 7 to the absorber 3 wherein it absorbs H₂S from a further quantity of gas, as described.

Instead of combining the H₂S produced in the generator 11 with the fuel gas passing through pipe 2, I may prefer to pass the generated H₂S or the gas containing it in relatively large proportions from pipe 20 through pipe 32 into a separate or special absorber 34. This absorber may be similar in construction to the absorber 3, but in many instances it can be made considerably smaller in size.

Fouled solution from pipe 24 passes through a pipe 36 and sprays or other distributing devices (not shown) in the absorber 34 into contact with this gas. Alternatively, a special or separate solution may be employed, and this is introduced into pipe 36, as from a pipe 37 which withdraws it from pipe 7 or some other source, and thence into the absorber 34.

Even when solution withdrawn from absorber 3 through pipe 24 is used, and this solution is fouled with respect to the fuel gas treated in that absorber, it is still capable of absorbing considerable quantities of H₂S from the richer gas entering the absorber 34. The highly fouled solution is then withdrawn from the bottom of the absorber 34 and delivered as by a pump 39 into the actifier 5, where it is aerated or otherwise regenerated as described hereinabove.

The actified solution is returned from the separator 29 through the pipe 7 to the absorber 3, or part or all of it may be returned through pipes 37 and 36 to the absorber 34, as previously described. Gas from which at least a major portion of the H₂S has been removed passes from the absorber 34 through a pipe 42. When substantially pure H₂S is produced in the generator 11, it may be substantially completely absorbed in the absorber 34.

In other cases, however, as when fuel gas is supplied to the generator 11 to react with the molten sulphur to form H₂S, the gas entering the absorber 34 from pipe 32 may not consist entirely of H₂S. In that case, it is generally preferable to return the residual or unabsorbed gas leaving the absorber 34 through pipe 42 to the gas stream.

This is readily done by closing a valve in pipe 42 and passing the gas from pipe 42 through pipe 45 to pipe 2. The gas can of course be returned to the gas stream at some other point, but its return at approximately this point is advantageous since it permits absorption of any H2S remaining therein along with the H2S normally present in the gas entering the absorber 3.

Sulphur withdrawn from the separator 29 through the pipe 30 may be washed or otherwise treated by processes known to the art, to remove therefrom any undesirable impurities, and it is then ready for utilization in fungicides, medicinal soaps and the like as previously set forth. This sulphur is very finely divided and substantially colloidal in nature and therefore very effective for the purposes for which it is intended.

My process has been described hereinabove with special reference to its operation in combination with a gas purifying system of the sulphur recovery type. This combination produces very desirable results, and is especially desirable from the economic point of view, but it is to be understood that my invention is not limited to this combination, and that it may be practiced entirely separately from any other process for the manufacture or purification of fuel gas.

It will be obvious to those skilled in the art that certain changes can be made in the several parts of my apparatus and the several steps of my process, in addition to those described hereinabove, without departing from the spirit of my invention, and it is my intention to cover in the claims such modifications as are included within the scope thereof.

I claim as my invention:

1. The process of improving the quality of commercial sulphur, which comprises converting commercial sulphur into substantially entirely gaseous hydrogen sulphide, absorbing the gaseous hydrogen sulphide in a liquid containing a compound capable of combining with H2S to form a sulphur compound which liberates elemental sulphur in very finely divided form when the liquid is subjected to the influence of an oxygen-containing gas, subjecting the liquid to the influence of an oxygen-containing gas to complete the conversion of the commercial sulphur to sulphur of substantially colloidal fineness, and recovering the thereby improved commercial sulphur therefrom.

2. The process of preparing sulphur of substantially colloidal fineness, which comprises dividing a stream of gas containing hydrogen and hydrogen sulphide into two parts, contacting the first part with molten sulphur to form hydrogen sulphide which enriches that part of the gas, scrubbing the second part of the gas with a liquid containing a compound capable of combining with hydrogen sulphide to form a compound which liberates elemental sulphur of substantially colloidal fineness when the liquid is actified by treatment with an oxidizing agent and thereby absorbing hydrogen sulphide from that part of the gas and partially fouling the liquid, scrubbing the first part of the gas with the partially fouled liquid employed in scrubbing the said second part of the gas and thereby absorbing a further quantity of hydrogen sulphide in the liquid, actifying the liquid by contacting it with an oxygen-containing gas, separating liberated sulphur from the liquid, and recirculating the actified liquid to absorb more hydrogen sulphide.

3. The process of preparing sulphur of substantially colloidal fineness, which comprises dividing a stream of gas containing hydrogen and hydrogen sulphide into two parts, contacting the first part with molten sulphur to form hydrogen sulphide which enriches that part of the gas, scrubbing the second part of the gas with a liquid containing a compound capable of combining with hydrogen sulphide to form a compound which liberates elemental sulphur of substantially colloidal fineness when the liquid is actified by treatment with an oxidizing agent and thereby absorbing hydrogen sulphide from that part of the gas and partially fouling the liquid, scrubbing the first part of the gas with the partially fouled liquid employed in scrubbing the said second part of the gas and thereby absorbing a further quantity of hydrogen sulphide in the liquid, combining the scrubbed first part of the gas with the unscrubbed second part of the gas, actifying the liquid by aeration and thereby liberating a large amount of sulphur of substantially colloidal fineness, separating liberated sulphur from the actified solution, and recirculating the actified solution to scrub a further amount of the said second part of the gas.

CHARLES J. RAMSBURG.